US012812380B2

(12) United States Patent
Kazato

(10) Patent No.: US 12,812,380 B2
(45) Date of Patent: Nov. 24, 2026

(54) ATTACK DETECTION SYSTEM, ATTACK DETECTION METHOD, AND ATTACK DETECTION PROGRAM BASED ON CORE NETWORK RESOURCE ABNORMALITY DETECTION

(71) Applicant: NTT, Inc., Tokyo (JP)

(72) Inventor: Yuta Kazato, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/870,164

(22) PCT Filed: Jun. 1, 2022

(86) PCT No.: PCT/JP2022/022310

§ 371 (c)(1),
(2) Date: Nov. 27, 2024

(87) PCT Pub. No.: WO2023/233582

PCT Pub. Date: Dec. 7, 2023

(65) Prior Publication Data

US 2025/0374057 A1 Dec. 4, 2025

(51) Int. Cl.
*H04W 12/121* (2021.01)

(52) U.S. Cl.
CPC ................................. *H04W 12/121* (2021.01)

(58) Field of Classification Search
None
See application file for complete search history.

(56) References Cited

U.S. PATENT DOCUMENTS

2012/0096548 A1* 4/2012 Riordan .............. H04L 63/1491 726/23
2012/0096549 A1* 4/2012 Amini ................. H04L 63/1433 726/23
2019/0182266 A1* 6/2019 Doron ................... H04L 63/145
2021/0306351 A1 9/2021 Togari et al.

FOREIGN PATENT DOCUMENTS

JP 2020022133 A 2/2020
JP 2020194478 A 12/2020

OTHER PUBLICATIONS

Balasubramanian et al., "RIC: A RAN intelligent controller platform for AI-enabled cellular networks," IEEE Internet Computing, Mar./Apr. 2021, 25(2):7-17.

(Continued)

*Primary Examiner* — William J. Goodchild
*Assistant Examiner* — Mayasa A. Shaawat
(74) *Attorney, Agent, or Firm* — Fish & Richardson P.C.

(57) ABSTRACT

An attack detection device detects a cyber attack in a mobile network that includes a RAN including RAN communication devices that perform wireless communication with a user terminal. The attack detection device includes an information integration unit and an attack detection unit. The information integration unit acquires pieces of resource information of the RAN communication devices and integrates the pieces of resource information. The attack detection unit detects the cyber attack based on the integrated pieces of resource information.

7 Claims, 7 Drawing Sheets

(56) References Cited

OTHER PUBLICATIONS

Mortensen et al., "DDoS Open Threat Signaling (DOTS) Requirements," Internet Engineering Task Force (IETF) Request for Comments: 8612, May 2019, 22 pages.
Trendmicro.com [online], "Trend Micro Launches New Security Solution 'Mobile Network Security™' to Protect5G/Local 5G Environments," Apr. 2021, retrieved on Oct. 2024, retrieved from URL<https://www.trendmicro.com/ja_jp/about/press-release/2021/pr-20210408-01.html>, 11 pages (with English translation).

* cited by examiner

ATTACK DETECTION SYSTEM, ATTACK DETECTION METHOD, AND ATTACK DETECTION PROGRAM BASED ON CORE NETWORK RESOURCE ABNORMALITY DETECTION

CROSS-REFERENCE TO RELATED APPLICATIONS

This application is a National Stage application under 35 U.S.C. § 371 of International Application No. PCT/JP2022/022310, having an International Filing Date of Jun. 1, 2022. The disclosure of the prior application is considered part of the disclosure of this application, and is incorporated by reference in its entirety into this application.

TECHNICAL FIELD

The present invention relates to an attack detection device, an attack detection system, an attack detection method, and an attack detection program.

BACKGROUND ART

A mobile network includes a radio access network (hereinafter, also referred to as "RAN") that includes a plurality of base stations for communicating with a user terminal and a core network (hereinafter, also referred to as "CN") that is a backbone communication network and is connected to an external network such as another mobile network or the Internet.

As a next generation standard of the mobile network, 5G and NR are promoted. In the 5G, an ultra-high speed, multiple simultaneous connection, and an ultra-low latency are set as requirements, a communication device configuring a base station in the RAN is made open, and virtualization and functional separation are progressed.

In an open RAN, the communication device is implemented by virtualization software that operates on a virtualization infrastructure instead of on a conventional dedicated device. Furthermore, as RAN architectures, the communication device is functionally separated as a central unit (CU), a distributed unit (DU), and a radio unit (RU). Furthermore, in the open RAN, it is promoted, for example, to perform network control, resource optimization, or the like by a RAN intelligence controller (RIC) that is one type of a centralized management type controller equipped with artificial intelligence (AI) functions (for example, refer to Non-patent Literature 1).

CITATION LIST

Non Patent Literature

Non-patent Literature 1: B. Balasubramanian et al., "RIC: A RAN Intelligent Controller Platform for AI-Enabled Cellular Networks", in *IEEE Internet Computing*, vol. 25, no. 2, pp. 7-17, 1 March-April 2021; Non-patent Literature 2: "Trend Micro Mobile Network Security™, a New Security Solution to Protect 5G/Local 5G Environments, Is Now Available", an online press release of Trend Micro Incorporated, Apr. 8, 2021; Non-patent Literature 3: "RFC 8612-DDOS Open Threat Signaling (DOTS) Requirements", published by Internet Engineering Task Force (IETF), May 2019

SUMMARY OF INVENTION

Technical Problem

However, there is a concern about an increase in cyber attacks that misuse specifications of the communication device that has been made open in the 5G.

The cyber attack includes, for example, a radio wave jamming attack, a DDOS attack, or the like that occurs in a communication layer, a wireless physical layer, an RRC protocol layer, or the like between a user terminal and communication devices of a base station. Through these cyber attacks, unauthorized control of user communication and a communication device, service interruption due to bandwidth resource of a network becoming saturated, unauthorized acquisition of confidential information, or the like is executed. As a result, there is a possibility of a user experiencing a communication failure or information leakage, and further, there is a possibility of resources of the entire mobile network becoming overwhelmed.

For such a cyber attack, for example, it has been proposed to insert a security appliance between specific communication devices of the RAN to detect a cyber attack (for example, refer to Non-patent Literature 2).

Furthermore, for a DDOS attack, a mechanism has been proposed that introduces a client server into a network and handling a DDOS attack in cooperation with an RIC of each RAN (for example, refer to Non-patent Literature 3).

However, as described above, due to a change in the RAN architecture in the 5G, specifications of communication devices have become diverse. Therefore, even if a cyber attack is detected at a single location of a network, there is a possibility that the cyber attack, which may be performed in a distributed manner in various places of the network, cannot be accurately detected because data regarding the cyber attack cannot be sufficiently acquired.

In an attack detection device that detects a cyber attack, it is required to improve detection accuracy.

Solution to Problem

An attack detection device according to the present invention detects a cyber attack in a mobile network that includes a radio access network including a plurality of first communication devices that perform wireless communication with a user terminal. The attack detection device includes the following: an information integration unit configured to acquire pieces of resource information of the plurality of first communication devices and integrate the pieces of resource information; and an attack detection unit configured to detect the cyber attack based on the integrated pieces of resource information.

Advantageous Effects of Invention

According to the present invention, it is possible to improve accuracy of detection of a cyber attack.

DESCRIPTION OF EMBODIMENTS

Next, an embodiment for carrying out the present invention (hereinafter, referred to as the "present embodiment") will be described with reference to the drawings.

Figure 1:
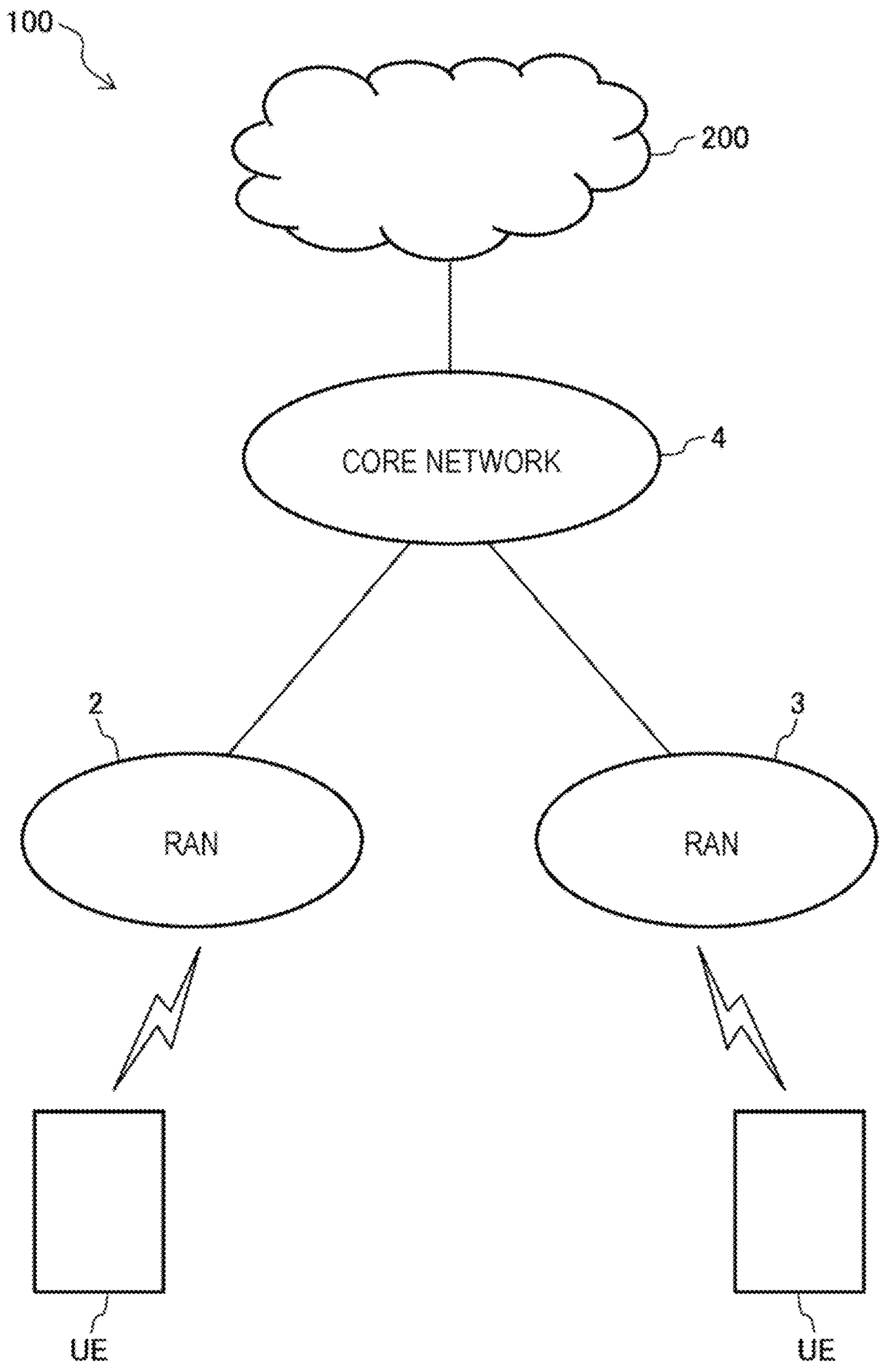
FIG. 1 is a diagram for explaining a mobile network to which an attack detection device according to the present embodiment is applied.

FIG. 1 is a diagram for explaining a mobile network to which an attack detection device according to the present embodiment is applied.

Figure 2:
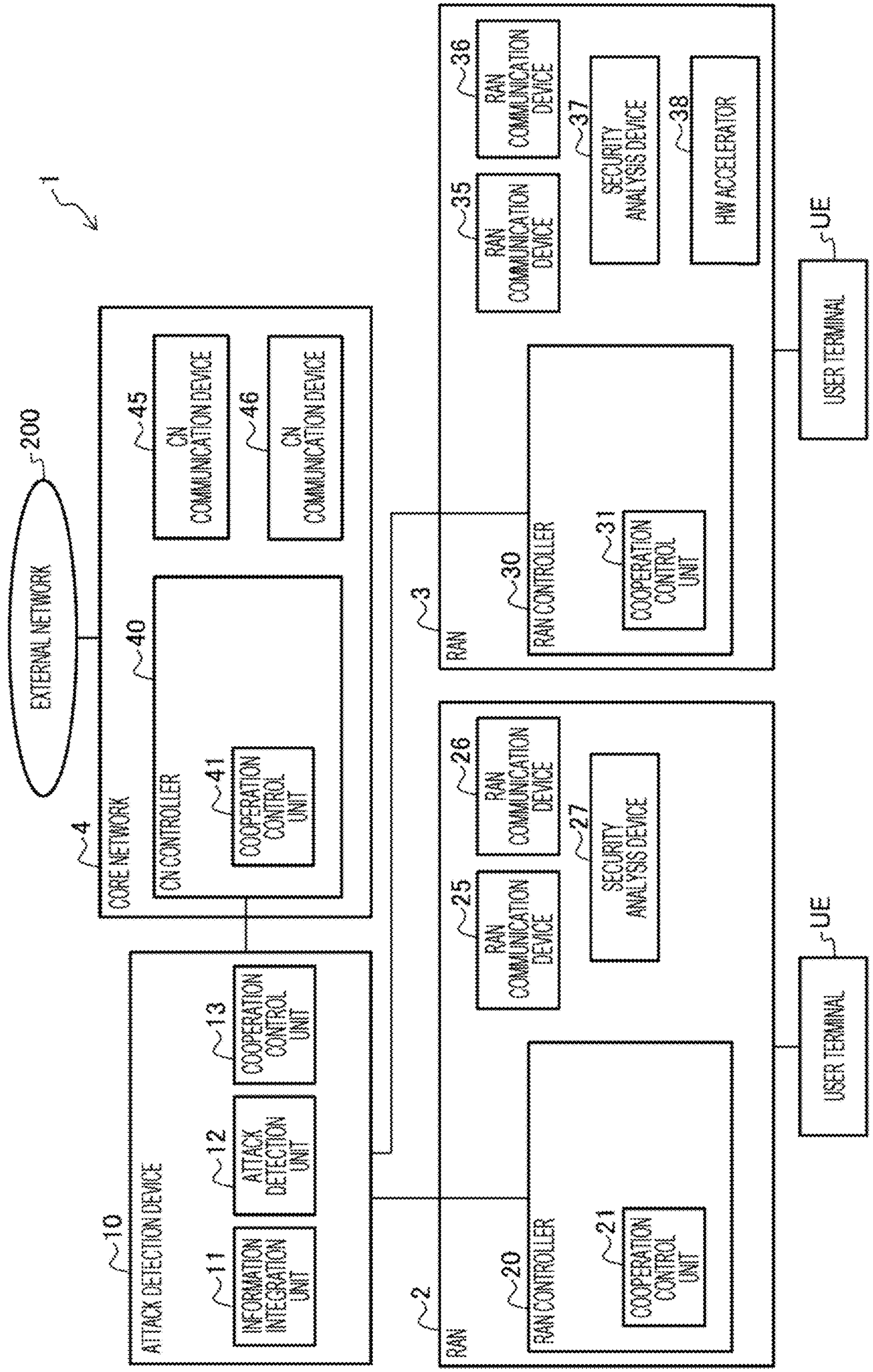
FIG. 2 is a block diagram illustrating a configuration of an attack detection system including the attack detection device according to the present embodiment.

FIG. 2 is a block diagram illustrating a configuration of an attack detection system including the attack detection device according to the present embodiment.

As illustrated in FIG. 1, a mobile network 100 includes a RAN 2 and a RAN 3 that are radio access networks and a core network 4. Each of the RANs 2 and 3 covers a set area and performs wireless communication with a user terminal UE in the area. The core network 4 is a backbone communication network and controls wireless communication in the RANs 2 and 3 and relays data between the RANs 2 and 3 and an external network 200 (another mobile network, the Internet, or the like).

In FIG. 1, an example is illustrated in which the mobile network 100 includes one core network 4 and two RANs 2 and 3. However, the number of core networks and the number of RANs are not limited to those shown in the example of FIG. 1.

As illustrated in FIG. 2, the RAN 2 includes RAN communication devices 25 and 26 (first communication devices), and the RAN 3 includes RAN communication devices 35 and 36 (first communication devices). Each of the RAN communication devices 25, 26, 35, and 36 performs data transfer and executes protocol processing. In 5G that is a next generation standard of a mobile network, as an architecture of the RAN, RAN communication devices are functionally separated into a radio unit (RU), a distributed unit (DU), and a central unit (CU). The RU is an antenna, and the DU and the CU are configured on a general-purpose server device. The DU functions as a slave station, and the CU functions as a master station that is a high-order communication device. Communication devices configuring the master station and the slave station are connected to each other via a dedicated network called a fronthaul and may perform high-speed communication.

Examples of a user terminal UE includes a mobile terminal device such as a mobile phone or a smartphone, a mobile tablet terminal device, a personal computer, an internet of things (IoT) device, and the like.

Resource is allocated to a user terminal UE from a RAN 2, 3 through wireless communication, and the user terminal UE communicates with the core network 4 via the RAN 2, 3.

The core network 4 authenticates the user terminal UE and performs position management, radio bearer control, session management, policy control, packet transfer control, data relay, or the like. As a result, the user terminal UE may be connected to the external network 200.

As illustrated in FIG. 2, the core network 4 includes CN communication devices 45 and 46 (second communication device). The CN communication devices 45, 46 perform data transfer between the RAN communication devices 25, 26, 35, 36 and the external network 200 and execute protocol processing.

Note that the number of RAN communication devices in the RANs 2 and 3 and the number of CN communication devices in the core network 4 are not limited to those in the example illustrated in FIG. 2 and may be appropriately increased or decreased.

In the 5G mobile network, data communication is realized by separating signals transmitted and received among the user terminal UE, the RAN 2, 3, and the core network 4 into a control plane (C-Plane) signal and a user plane (U-Plane) signal.

The C-Plane signal is a control signal that takes a role of controlling and managing a session between the user terminal UE and the RAN communication device 25, 26, 35, 36. The U-Plane signal is a signal that transmits actual data (for example, image, sound) in communication. There is a possibility that a cyber attack is made on these signals.

Examples of a cyber attack include data congestion of the U-Plane signal, a signal spoofing attack of the C-Plane signal, a radio wave jamming attack, and an RRC protocol signaling DOS attack.

Further, there is a concern for a large and distributed cyber attack that exploits a specification of a communication device made open under 5G. Such a cyber attack includes a volumetric distributed denial of service (DDOS, distributed service interruption) attack that performs a cyber attack by controlling a large number of user terminals UE infected with a bot virus.

By such cyber attacks, there is a possibility that the user terminal UE, the RAN communication device 25, 26, 35, 36, or the like is illegally controlled, resources of the mobile network 100 is overwhelmed and a service is interrupted, or confidential information is illegally acquired. As a result, a communication failure or an information leakage may occur for the user terminal UE and an overall provision of service of the mobile network 100 may be unable to be provided.

An attack detection device 10 according to the present embodiment is configured to detect and handle a cyber attack performed on the mobile network 100.

As illustrated in FIG. 2, the attack detection device 10 communicates with RAN controllers 20 and 30 (first controllers) provided in the RANs 2 and 3 and a CN controller 40 (second controller) provided in the core network 4 and detects and handles a cyber attack in cooperation. That is, the attack detection device 10, the RAN controllers 20 and 30, and the CN controller 40 form an attack detection system 1.

The RAN controllers 20 and 30 manage the RAN communication devices 25, 26, 35, and 36 provided in the RANs 2 and 3 and acquire resource information of the RAN communication devices 25, 26, 35, and 36.

The CN controller 40 manages the CN communication devices 45 and 46 provided in the core network 4 and acquires resource information of the CN communication devices 45 and 46.

The attack detection device 10, the RAN controllers 20 and 30, and the CN controller 40 may, for example, be configured on a general-purpose server device equipped with an AI function. The RAN controllers 20 and 30 may each be configured, for example, as a part of a function of a high-order communication device of a corresponding RAN 2, 3 or may be configured on another computer. The CN controller 40 may be configured, for example, as a part of a function of one of the CN communication devices 45 and 46 or may be configured on another computer.

As illustrated in FIG. 2, the attack detection device 10 includes an information integration unit 11, an attack detection unit 12, and a cooperation control unit 13. Details of processing executed by each unit will be described in the embodiment.

The RAN controllers 20 and 30 and the CN controller 40 respectively include cooperation control units 21, 31, and 41. The cooperation control units 21, 31, and 41 share information with the cooperation control unit 13 of the attack detection device 10 and execute processing instructed from the cooperation control unit 13. That is, the RAN controllers 20 and 30 and the CN controller 40 are controlled by the attack detection device 10 via the cooperation control unit 13.

Although not illustrated, each of the attack detection device 10, the RAN controllers 20 and 30, and the CN controller 40 includes a storage. The storage stores therein information necessary for processing by each unit and temporarily stores therein a processing result of each unit.

Security analysis devices 27 and 37 are dynamically deployed in the RANs 2 and 3. The security analysis devices 27 and 37 may, for example be separately formed from the RAN controllers 20 and 30 by a virtual machine, a container, or the like in a general-purpose server device configuring the RAN controllers 20 and 30. The security analysis devices 27 and 37 are activated as necessary by the cooperation control units 21 and 31 of the RAN controllers 20 and 30.

In addition, in the RAN 3, a hardware accelerator (hereinafter, also referred to as "HW accelerator") 38 is provided as a hardware configuration. The HW accelerator 38 may be, for example, an FPGA board, an FPGA SmartNIC, a GPU board, or the like. By offloading specific processing from software to the HW accelerator 38 for execution, it may be possible to reduce a delay of the processing and to reduce power consumption. In the present embodiment, the HW accelerator 38 executes steering processing of transferring communication data from the RAN communication devices 35 and 36 to the security analysis device 37 and executes specific processing that is offloaded from the security analysis device 37.

Example 1

Figure 3:
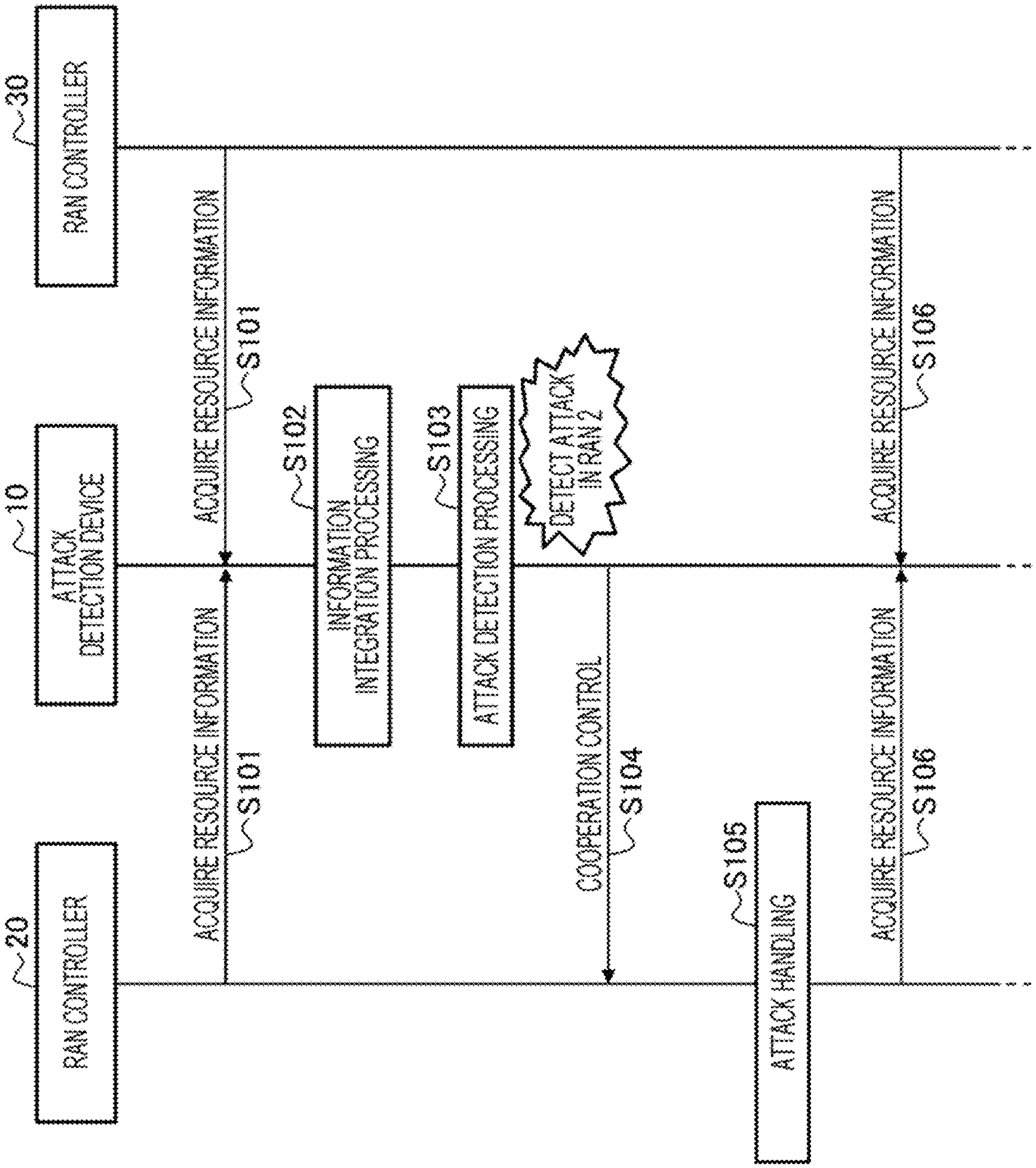
FIG. 3 is a sequence diagram for explaining a flow of processing of an attack detection system according to an Example 1.

FIG. 3 is a sequence diagram for explaining a flow of processing of an attack detection system according to an Example 1.

In the Example 1, an example of processing suitable for detecting a cyber attack that occurs locally between a RAN communication device 25, 26, 35, 36 and a user terminal UE, such as a radio wave jamming attack, an RRC protocol signaling Dos attack, or the like, will be described.

The radio wave jamming attack is an attack that disables wireless communication between a user terminal UE and a RAN communication device 25, 26, 35, 36 by transmitting jamming radio waves to radio waves transmitted from the user terminal UE to the RAN communication device 25, 26, 35, 36. The radio wave jamming attack occurs in a communication layer, a wireless physical layer, a radio resource control (RRC) protocol layer, or the like between the user terminal UE and the RAN communication device 25, 26, 35, 36. Such a radio wave jamming attack may be detected by receiving the jamming radio waves. However, as described above, in the 5G, a high-order communication device does not include an antenna due to function separation. Therefore, it is difficult for the high-order communication device to receive the jamming radio waves and detect the radio wave jamming attack.

The RRC protocol signaling DOS attack is an attack that disables service provision by applying a processing load on a high-order communication device such as a CU or a DU included in a RAN 2, 3 by transmitting a large number of packets faking a specific sequence or specific information of an RRC protocol. The RRC protocol is a protocol used for procedures of Random Access and RRC Setup that are sequences for establishing connection between a RAN communication device 25, 26, 35, 36 and a user terminal UE and for resource control after the connection has been established.

There is a conventional method for detecting the RRC protocol signaling DOS attack, and that is to perform investigation based on an increase in a processing load of a high-order communication device of the RAN or based on a report from a user due to a service provision load. However, this method has problems on detection accuracy and detection speed.

In the Example 1 of the present embodiment, the information integration unit 11 of the attack detection device 10 executes information integration processing of acquiring resource information of the plurality of RAN communication devices 25, 26, 35, and 36, which is carried out via the cooperation control units 21 and 31 of the RAN controllers 20 and 30, and integrating the resource information of the plurality of RAN communication devices 25, 26, 35, and 36.

The attack detection unit 12 detects a cyber attack on a RAN 2, 3 on the basis of the resource information integrated by the information integration unit 11.

The cooperation control unit 13 shares information regarding the cyber attack (feature information and handling information) detected by the attack detection unit 12 with a cooperation control unit 21, 31 of a RAN controller 20, 30 and controls the cooperation control unit 21, 31 to handle the cyber attack.

Subsequently, details of the processing in the Example 1 will be described with reference to FIG. 3.

Information Integration Processing

As illustrated in FIG. 3, the information integration unit 11 of the attack detection device 10 acquires pieces of resource information of the RAN communication devices 25, 26, 35, 36 from each of the RAN controllers 20 and 30 (step S101). The pieces of resource information may be acquired periodically, for example.

The information integration unit 11 executes information integration processing of integrating the pieces of resource information of the RAN communication devices 25, 26, 35, and 36 (step S102).

A piece of resource information is resource information of a RAN communication device 25, 26, 35, 36 belonging to a RAN 2, 3 regarding wireless communication with a user terminal UE. The piece of resource information is information that may change upon receiving a cyber attack and may be used as a reference for detecting the cyber attack.

For example, in a case where the radio wave jamming attack is to be detected, the piece of resource information may include information such as radio wave quality information of the user terminal UE, radio wave strength information of the RAN communication device 25, 26, 35, 36, resource information of a cell, the number of user terminals connected to the cell, or the number of signaling requests.

For example, in a case where the RRC protocol signaling DOS attack is to be detected, the piece of resource information may include information such as the number of RRC Request Messages, a frequency of RRC Requests, the number of connected user terminals, or the number of signaling requests.

As an example of the information integration processing, the information integration unit 11 may associate control information of wireless communication between a user terminal UE and a RAN communication device 25, 26, 35, 36 with a piece of resource information. The control information is, for example, information such as user terminal UE identification information or radio bearer control information. As described above, wireless communication in the RANs 2 and 3 is controlled by the core network 4. The information integration unit 11 may acquire the control information from the CN communication devices 45 and 46 via the cooperation control unit 41 of the CN controller 40.

In this way, by associating the resource information with the control information, pieces of information in a plurality of communication protocol layers constructed in the RAN 2, 3 are associated, enabling analysis to be carried out in a cross-sectional manner.

In the 5G in which mapping of an IP packet that is transmitted from or received by the user terminal UE and a radio bearer is performed, there is a case where it is not possible to acquire information from which a cyber attack may be detected depending on a position in the communication protocol layers where a piece of resource information is acquired.

As an example, as described above, in the 5G, the RAN communication devices 25, 26, 35, and 36 are functionally separated into a plurality of communication devices including the RU, the DU, and the CU. Therefore, depending on the communication device, there is, for example, a case where acquiring wireless communication quality information or a communication frequency is not possible or a case where acquiring mapping information between the radio bearer and the IP packet is not possible. Even in such cases, since pieces of information in a plurality of communication protocol layers are associated by executing the information integration processing, even if there is a place where sufficient resource information may not be obtained, a piece of resource information in another protocol layer may be analyzed in a cross-sectoral manner. Therefore, the cyber attack may be easily detected.

As another example of the information integration processing, the information integration unit 11 may associate resource information acquired from the RAN 2 with resource information acquired from the RAN 3 with each other. For example, the information integration unit 11 associates pieces of common resource information acquired from the RANs 2 and 3 with each other. In a case where a cyber attack occurs in the RAN 3, the piece of resource information of the RAN 3 will show a large change compared to the piece of resource information of the RAN 2. Therefore, the cyber attack on the RAN 3 may be easily detected.

Note that the information integration processing is not limited to these modes and may be appropriately modified. Furthermore, in the information integration processing, the processing of associating the pieces of resource information with the control information and the processing of associating the pieces of resource information of different RANs 2 and 3 with each other may both be executed.

Attack Detection Processing

The attack detection unit 12 executes attack detection processing of detecting whether a cyber attack has occurred in the RANs 2 and 3, on the basis of the pieces of resource information that have been integrated by the information integration unit 11 (step S103).

As an example, the attack detection unit 12 may detect the cyber attack by analyzing the integrated pieces of resource information in a cross-sectoral manner with an AI function that has learned, in advance, resource information in a normal state.

In a case where the integrated pieces of resource information include resource information deviating from the normal state, that is, resource information in which an abnormality occurs, the attack detection unit 12 detects the cyber attack. For example, the attack detection unit 12 may detect the cyber attack when the number of pieces of resource information in which an abnormality occurs in the integrated pieces of resource information exceeds a certain number.

In a sequence diagram of FIG. 3, an example is illustrated in which a cyber attack is detected from resource information of RAN 2. Note that, in a case where a cyber attack is not detected, cooperation control processing to be described later is not executed, and the attack detection device 10 ends the processing.

The attack detection unit 12 creates information regarding a cyber attack for the detected cyber attack. The information regarding a cyber attack includes feature information of the cyber attack and handling information on the cyber attack. The feature information of the cyber attack may include, for example, a type of the cyber attack, IP address information of an attack destination, the user terminal UE identification information, the radio bearer control information, or the like. The handling information on the cyber attack is information indicating a response to be taken against the detected cyber attack and includes, for example, blocking or shaping (limitation of communication amount) of communication data or the like.

Cooperation Control Processing

The cooperation control unit 13 performs cooperation control on the RAN controller 20 of the RAN 2 in which the cyber attack has been detected (step S104).

The cooperation control unit 13 handles the cyber attack in cooperation by sharing the information regarding a cyber attack, that has been created by the attack detection unit 12, with the RAN controller 20 of the RAN 2.

Specifically, the cooperation control unit 13 outputs a handling request to handle the cyber attack to the cooperation control unit 21 of the RAN controller 20. The handling request includes the information regarding a cyber attack created by the attack detection unit 12.

The cooperation control unit 21 of the RAN controller 20 handles the cyber attack in response to the handling request inputted from the cooperation control unit 13 (step S105).

As an example of handling, for example, the cooperation control unit 21 dynamically deploys the security analysis device 27. The cooperation control unit 21 executes steering processing of transferring pieces of communication data that are transmitted and received between the RAN communication devices 25 and 26 and the user terminal UE to the security analysis device 27.

The security analysis device 27 executes processing for analyzing each piece of communication data and determines whether not there is communication data corresponding to the information regarding a cyber attack (a type of cyber attack, attack destination IP address information, user terminal UE identification information, radio bearer control information, or the like) shared by the cooperation control unit 13.

The security analysis device 27 may, for example, be inputted with the U-Plane signal and the C-Plane signal as a piece of communication data to perform security analysis. For example, as the analysis method, signature analysis of analyzing whether or not feature information included in a piece of communication data matches the feature information of the cyber attack may be performed. For example, as the analysis method, statistical amount analysis using statistical information, such as a communication amount or the number of times of signaling transmission, and a threshold may be performed. For example, as the analysis method, a method of detecting an abnormality of a piece of communication data by making an AI learn data in a normal communication state in advance may be performed.

Note that, in a case where the handling request is inputted to the RAN controller 30 of RAN 3, the cooperation control unit 31 handles the cyber attack similarly to the cooperation control unit 21. Here, since the HW accelerator 38 is provided in the RAN 3, the cooperation control unit 31 may make the HW accelerator 38 execute the steering processing. In addition, the cooperation control unit 31 may offload a part of the analysis processing that is to be executed by the security analysis device 37 to the HW accelerator 38. As a result, it may be possible to reduce an operation delay of the analysis processing and reduce power consumption for the analysis processing.

In a case where a piece of communication data subjected to the cyber attack is identified, the security analysis device 27 notifies the cooperation control unit 21 of information regarding the identified piece of communication data. Upon receiving the notification from the security analysis device 27, the cooperation control unit 21 takes a measure such as blocking or shaping wireless communication corresponding to the identified piece of communication data, in accordance with the handling information shared by the cooperation control unit 13.

When the cooperation control unit 21 ends the handling of the cyber attack, the cooperation control unit 13 of the attack detection device 10 ends the cooperation control processing.

Although description is omitted, the attack detection device 10 subsequently acquires the resource information from the RAN controllers 20 and 30 again (step S106), executes the information integration processing and the attack detection processing, and, when a cyber attack is detected, executes the cooperation control processing.

In this way, in the Example 1, by integrating the pieces of resource information of the RAN communication devices 25, 26, 35, and 36 and analyzing the resource information in a cross-sectoral manner, it is possible to detect a cyber attack that is locally performed in the RANs 2 and 3.

In particular, a radio wave jamming attack, whose jamming radio waves may not be received by the high-order communication device of the RAN, may be detected on the basis of resource information acquired from the high-order communication device.

Furthermore, it may be possible to quickly and accurately detect an RRC protocol signaling DOS attack, which has conventionally been investigated based on a resource abnormality in the high-order communication device or a declaration of a user, by analyzing the pieces of resource information in a cross-sectoral manner.

Example 2

Figure 4:
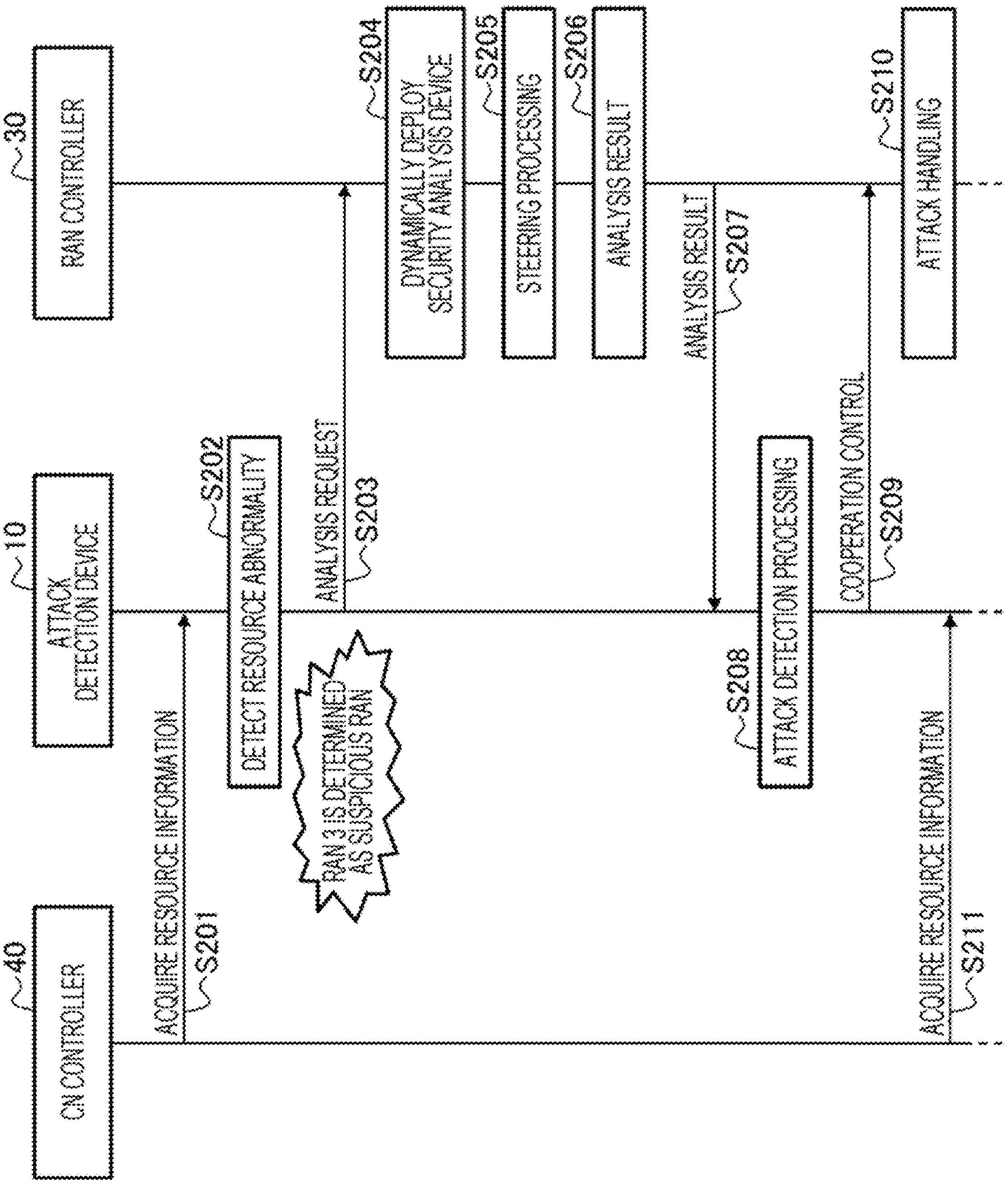
FIG. 4 is a sequence diagram for explaining a flow of processing of an attack detection system according to an Example 2.

FIG. 4 is a sequence diagram for explaining a flow of processing of an attack detection system according to an Example 2.

In the Example 2, processing suitable for detecting a large-scale cyber attack that is distributed and performed in the mobile network 100, such as a Volumetric DDOS attack, will be described.

In the Example 2, in a case where an abnormality is detected in resource information of a CN communication device 45, 46 of the core network 4, the cooperation control unit 13 of the attack detection device 10 controls a RAN controller 20, 30 of a RAN 2, 3 to execute analysis processing of analyzing communication data of RAN communication devices 25, 26, 35, 36. Specifically, the cooperation control unit 13 outputs a request for the analysis processing to a cooperation control unit 21, 31 of the RAN controller 20, 30.

The cooperation control unit 21, 31 of the RAN controller 20, 30 dynamically deploys (activates) a security analysis device 27, 37 in the RAN 2, 3, in response to the request for the analysis processing inputted from the cooperation control unit 13. The cooperation control unit 21, 31 executes steering processing of transferring the communication data from the RAN communication devices 25, 26, 35, 36 to the security analysis device 27, 37 and makes the security analysis device 27, 37 execute the analysis processing.

Moreover, in the RAN 3, the cooperation control unit 31 makes the HW accelerator 38 execute the steering processing and offloads a part of the analysis processing from the security analysis device 37 to the HW accelerator 38 for execution.

The attack detection unit 12 of the attack detection device 10 detects a cyber attack on the basis of a result of the analysis processing.

The cooperation control unit 13 shares information regarding a cyber attack (handling information) on the cyber attack detected by the attack detection unit 12 with the cooperation control unit 21, 31 of the RAN controller 20, 30 and controls the cooperation control unit 21, 31 to handle the cyber attack.

Details of the processing of the Example 2 will be described with reference to FIG. 4.

Resource Abnormality Detection Processing

As illustrated in FIG. 4, the attack detection unit 12 of the attack detection device 10 acquires resource information of the CN communication devices 45 and 46 via the cooperation control unit 41 of the CN controller 40 of the core network 4 (step S201). The resource information of the CN communication devices 45 and 46 may include, for example, an inflow amount of data from each of the RANs 2 and 3.

The attack detection unit 12 executes abnormality detection processing for detecting an abnormality of the resource information of the CN communication devices 45 and 46 (step S202). As in the attack detection processing according to Example 1, for example, the attack detection unit 12 may execute the abnormality detection processing using an AI that has gone through learning, in advance, of resource information in a normal state. The attack detection unit 12 detects an abnormality in a case where there is resource information deviating from the normal state in the resource information of the CN communication devices 45 and 46.

In a case where an abnormality occurs in the resource information of the CN communication devices 45 and 46, there is a possibility that a distributed cyber attack such as the Volumetric DDOS attack is being performed. For example, in a case where an inflow amount of data from the RAN 3 exceeds a threshold, an occurrence of a cyber attack in the RAN 3 is suspected. However, it is not possible to identify a specific place of occurrence of the cyber attack in the RAN 3 merely from detecting the abnormality in the resource information of the CN communication devices 45 and 46. Therefore, in the Example 2, when an abnormality in the resource information of the CN communication devices 45 and 46 is detected, a place of occurrence of a cyber attack is identified by executing an analysis processing of analyzing communication data in the RAN in which the occurrence of the cyber attack is suspected.

Analysis Processing

In FIG. 4, an example is illustrated in which RAN 3 is determined as a suspicious RAN in which the occurrence of the cyber attack is suspected.

The cooperation control unit 13 of the attack detection device 10 outputs an analysis request to the cooperation control unit 31 of the RAN controller 30 of the RAN 3 that is the suspicious RAN (step S203).

The analysis request instructs to analyze communication data of the RAN communication devices 35 and 36 belonging to the RAN 3 with the user terminal UE in detail and includes information regarding the abnormality in the resource information of the CN communication devices 45 and 46 detected by the attack detection unit 12.

The cooperation control unit 31 of the RAN controller 30 dynamically deploys the security analysis device 37 in response to the analysis request (step S204).

The cooperation control unit 31 executes the steering processing of steering the communication data to the security analysis device 37 (step S205).

More specifically, the cooperation control unit 31 transfers pieces of communication data from the RAN communication devices 35 and 36 of the RAN 3 to the security analysis device 37. Here, the HW accelerator 38 is provided in the RAN 3. Therefore, the cooperation control unit 31 offloads the steering processing and makes the HW accelerator 38 execute the steering processing.

The cooperation control unit 31 makes the security analysis device 37 execute analysis processing for analyzing security of each piece of communication data transferred by the steering processing (step S206).

The security analysis device 37 executes the analysis processing of analyzing each piece of communication data and determines whether or not there is communication data related to the abnormality in the resource information of the CN communication devices 45 and 46, the information of which has been shared by the cooperation control unit 13.

The security analysis device 37 may, for example, perform security analysis with the U-Plane signal and the C-Plane signal being inputted as a piece of communication data. As in the Example 1, as an analysis method, a method such as signature analysis, statistical amount analysis, or abnormality analysis of a piece of communication data by the AI may be performed.

The cooperation control unit 31 offloads a part of the analysis processing to be executed by the security analysis device 37 to the HW accelerator 38 for execution.

In this way, by using the HW accelerator 38 in the RAN 3, it may be possible to reduce a delay of the steering processing and the analysis processing and, further, to reduce power consumed by the processing.

In a case where communication data subjected to the cyber attack is identified by the analysis processing, the security analysis device 37 notifies the cooperation control unit 31 of information related to the cyber attack. For example, in a case where the cyber attack is a DDOS attack, the information related to the attack may include identification information of a user terminal UE that is an attack source, information regarding a network/cell accessed by the user terminal UE, an IP address of an attack destination, an attack type, or the like.

When the analysis processing has been completed, the cooperation control unit 31 inputs an analysis result to the attack detection device 10 (step S207). The information related to the cyber attack notified from the security analysis device 37 is included in the analysis result. Note that, in a case where the analysis request is outputted to the RAN controller 20, the cooperation control unit 21 executes processing similar to the cooperation control unit 31 and makes the security analysis device 27 execute the analysis processing. Here, since a HW accelerator 38 is not provided in the RAN 2, the cooperation control unit 21 does not perform offloading to the HW accelerator.

Attack Detection Processing

The attack detection unit 12 of the attack detection device 10 executes attack detection processing of detecting whether or not there is an occurrence of a cyber attack in the RAN 3 on the basis of the analysis result inputted from the cooperation control unit 31 (step S208).

In a case where the analysis result of the RAN 3 includes the information related to the cyber attack, the attack detection unit 12 detects the occurrence of the cyber attack. The attack detection unit 12 creates handling information on the cyber attack that has been detected.

Cooperation Control Processing

As in the Example 1, the cooperation control unit 13 performs cooperation control on a RAN 3 in which a cyber attack has been detected (step S209).

The cooperation control unit 13 outputs a handling request that includes the handling information on the cyber attack, which has been created by the attack detection unit 12, to the cooperation control unit 31 of the RAN controller 30 of the RAN 3.

The cooperation control unit 31 of the RAN controller 30 handles the cyber attack in accordance with the handling request inputted from the cooperation control unit 13 (step S210).

When the handling of the cyber attack by the cooperation control unit 31 ends, the cooperation control unit 13 of the attack detection device 10 ends the cooperation control processing.

Although description is omitted, the attack detection device 10 subsequently acquires the resource information from the CN controller 40 again (step S211) and, in a case where an abnormality in the resource information is detected, executes the analysis processing, the attack detection processing, and the cooperation control processing.

In order to identify a source of occurrence of a cyber attack that is performed in a distributed manner like the Volumetric DDOS attack, detailed analysis processing on communication data of each of the RAN communication devices 25, 26, 35, and 36 is needed. However, to constantly execute the detailed analysis processing increases a communication load and the power consumption.

A large-scale, distributed cyber attack may affect the resources of the CN communication devices 45 and 46 of the core network 4. Therefore, in the Example 2 of the present embodiment, the security analysis device 27, 37 is temporarily activated in a RAN 2, 3 to execute analysis processing when a resource abnormality of a CN communication device 45, 46 is detected. As a result, as compared with a case where the analysis processing is constantly executed, it may be possible to identify the source of occurrence of a cyber attack while reducing the communication load and the power consumption.

Hardware Configuration

Figure 5:
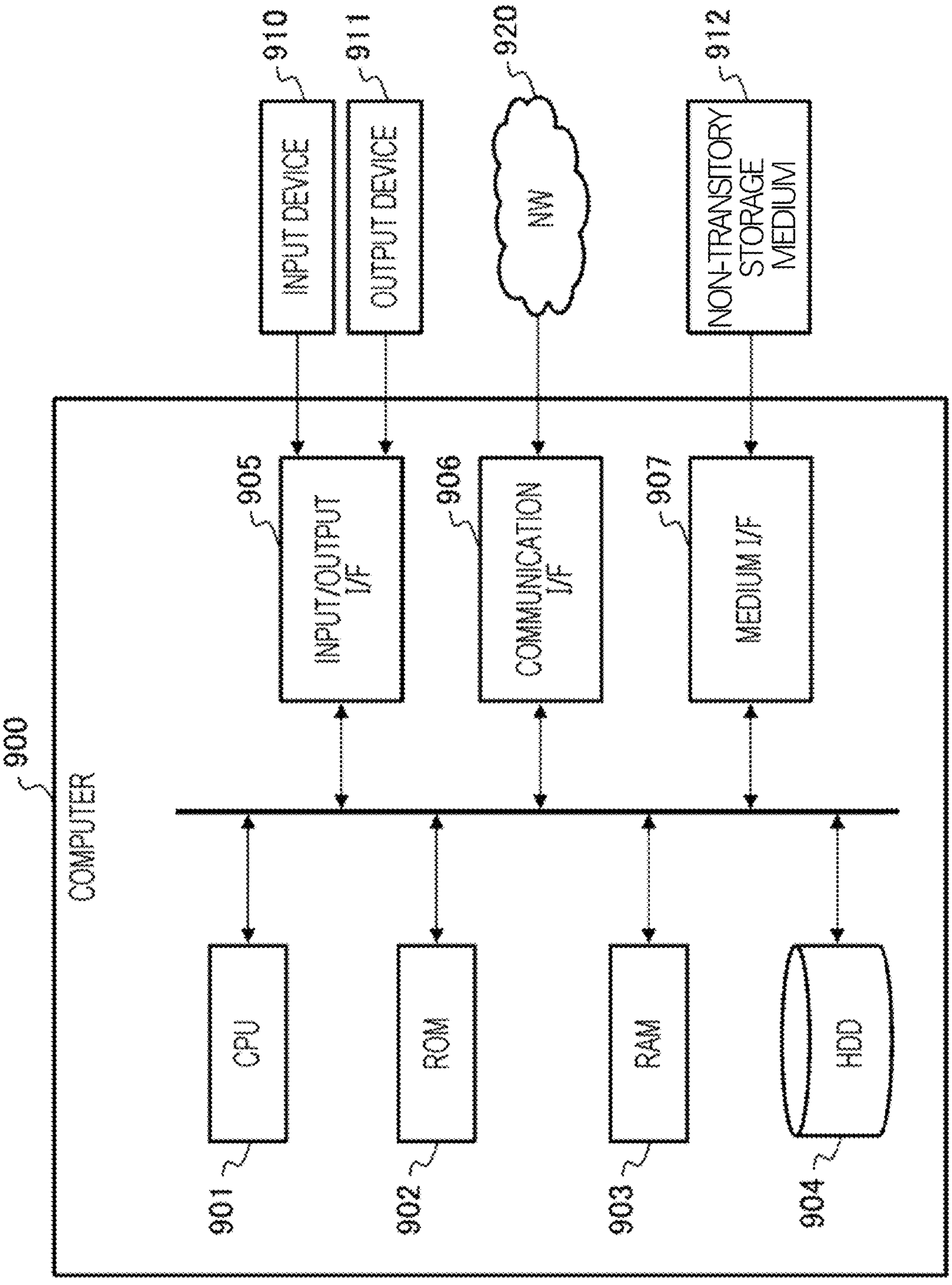
FIG. 5 is a hardware configuration diagram illustrating an example of a computer for implementing functions of the attack detection device according to the present embodiment.

The attack detection device 10 according to the present embodiment is implemented by a computer 900, for example, as illustrated in FIG. 5.

FIG. 5 is a hardware configuration diagram illustrating an example of the computer 900 for implementing functions of the attack detection device 10 according to the present embodiment.

The computer 900 includes a central processing unit (CPU) 901, a read only memory (ROM) 902, a random access memory (RAM) 903, a hard disk drive (HDD) 904, an input/output interface (I/F) 905, a communication I/F 906, and a medium I/F 907.

The CPU 901 operates on the basis of a program (attack detection program) stored in the ROM 902 or the HDD 904 and executes processing of each functional unit of the attack detection device 10 illustrated in FIG. 2. The ROM 902 stores a boot program to be executed by the CPU 901 when the computer 900 is started, a program related to hardware of the computer 900, and the like.

The CPU 901 controls an input device 910, such as a mouse or a keyboard, and an output device 911, such as a display, via the input/output I/F 905. The CPU 901 acquires data from the input device 910 and outputs generated data to the output device 911 both via the input/output I/F 905. Note that a graphics processing unit (GPU) or the like may be used as a processor together with the CPU 901.

The HDD 904 stores therein a program to be executed by the CPU 901, data to be used by the program, and the like. The communication I/F 906 receives data from another device via a communication network (for example, network (NW) 920), outputs the received data to the CPU 901, and transmits data generated by the CPU 901.

The medium I/F 907 reads a program or data stored in a non-transitory storage medium 912, and outputs the program or data to the CPU 901 via the RAM 903. The CPU 901 loads a program related to target processing from the non-transitory storage medium 912 into the RAM 903 via the medium I/F 907 and executes the loaded program. The non-transitory storage medium 912 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

In a case where the computer 900 functions as the attack detection device 10 according to the present embodiment, for example, the CPU 901 of the computer 900 implements the functions of the attack detection device 10 by executing the program loaded on the RAM 903. In addition, the HDD 904 stores therein data in the RAM 903. The CPU 901 reads the program related to the target processing from the non-transitory storage medium 912 and executes the program. Additionally, the CPU 901 may read the program related to the target processing from another device via the communication network (NW 920). Note that the RAN controllers 20 and 30 and the CN controller 40 may be implemented by a computer 900 as illustrated in FIG. 5.

Configuration of Embodiments and Effects Thereof (1) An attack detection device 10 detects a cyber attack in a mobile network 100 including a RAN 2, 3 (radio access network) that includes RAN communication devices 25, 26, 35, 36 (a plurality of first communication devices) that perform wireless communication with a user terminal UE.

The attack detection device 10 includes an information integration unit 11 and an attack detection unit 12.

The information integration unit 11 acquires pieces of resource information of the RAN communication devices 25, 26, 35, 36 and integrates the pieces of resource information.

The attack detection unit 12 detects the cyber attack based on the integrated pieces of resource information.

A piece of resource information is resource information of a RAN communication device 25, 26, 35, 36 included in a RAN 2, 3 regarding wireless communication with a user terminal UE, and the piece of resource information may change by receiving a cyber attack. That is, the piece of resource information is information that may be used as reference for detecting the cyber attack. However, due for example to functional separation of RAN communication devices in the 5G, there is a possibility that it may not be possible to acquire sufficient resource information for detecting the cyber attack depending on a RAN communication device. Therefore, in the Example 1, the information integration unit 11 integrates the pieces of resource information obtained from the RAN communication devices 25, 26, 35, and 36. As a result, the attack detection unit 12 may analyze the pieces of resource information of the RAN communication devices 25, 26, 35, and 36 in a cross-sectoral manner, and accuracy of detection of the cyber attack may be improved.

Note that the "plurality of first communication devices" may be a plurality of RAN communication devices provided in the same RAN or may be a plurality of RAN communication devices respectively provided in different RANS.

(2) The mobile network 100 includes a core network 4. The core network 4 includes a CN communication device 45, 46 (a second communication device) that controls the wireless communication in the RAN 2, 3 and relays data between the RAN, 2 3 and an external network 200.

The information integration unit 11 of the attack detection device 10 may, for example, integrate the pieces of resource information by associating control information of the wireless communication acquired from the core network 4 with the pieces of resource information of the RAN communication devices 25, 26, 35, 36.

As a result, since the pieces of resource information in a plurality of communication protocol layers in the RAN 2, 3 are associated in a cross-sectoral manner, even when there is a place in the communication protocol layers where sufficient resource information may not be obtained, resource information in another protocol layer may be analyzed in a cross-sectoral manner. Therefore, the cyber attack may be easily detected.

Note that an example of the information integration processing may not be limited to this. For example, the information integration unit 11 may integrate the pieces of resource information among the plurality of RAN communication devices 25, 26, 35, 36 by associating pieces of common resource information with each other.

(3) The mobile network 100 includes a core network 4. The core network 4 includes a CN communication device 45, 46 (a second communication device) that controls the wireless communication in the RAN 2, 3 and relays data between the RAN 2, 3 and an external network 200.

The attack detection device 10 includes a cooperation control unit 13.

When an abnormality is detected in resource information of the CN communication device 45, 46, the cooperation control unit 13 controls a RAN controller 20, 30 (a controller of a radio access network) and makes the RAN controller 20, 30 execute analysis processing of analyzing communication data of a RAN communication device 25, 26, 35, 36.

The attack detection unit 12 detects the cyber attack based on a result of the analysis processing.

In order to identify a source of occurrence of a cyber attack that is performed in a distributed manner such as the Volumetric DDOS attack, detailed analysis processing of analyzing communication data of the RAN communication devices 25, 26, 35, and 36 is needed. However, constant execution of such detailed analysis processing may cause an increase in a communication load or power consumption.

The attack detection device 10 executes analysis processing by temporarily activating a security analysis device 27, 37 in a RAN controller 20, 30 when a resource abnormality of the CN communication device 45, 46 of the core network 4 that relays data between the RAN 2, 3 and the external network 200 is detected. In this way, as compared with a case where the analysis processing is constantly executed, it may be possible to identify the source of occurrence of the cyber attack while reducing the communication load or the power consumption.

Note that, in the example shown in FIG. 4, an example has been described where an analysis request is outputted only to the RAN controller 30 of the RAN 3 in which the occurrence of the cyber attack is suspected. However, the disclosure is not limited to this example. For example, in a case where it is not possible to identify the suspicious RAN even though an abnormality has been detected in the resource information of the CN communication device 45, 46 by the attack detection unit 12, the cooperation control unit 13 may output the analysis request to both of the RAN controllers 20 and 30.

(4) A cooperation control unit 13 shares information regarding the cyber attack that has been detected by the attack detection unit 12 with a RAN controller 20, 30 and controls the RAN controller 20, 30 to make the RAN controller 20, 30 handle the cyber attack.

By cooperating with the RAN controller 20, 30 in a case where the attack detection device 10 detects a cyber attack, it may be possible to quickly handle the cyber attack. As a result, it may be possible to reduce a possibility of unauthorized control, a communication failure, network resource overload, or the like caused by the cyber attack.

(5) An attack detection system 1 detects a cyber attack in a mobile network 100 that includes a RAN 2, 3 (a radio access network) and a core network 4.

The attack detection system 1 includes an attack detection device 10, a RAN controller 20, 30 (a first controller) that manages the RAN 2, 3, and a CN controller 40 (a second controller) that manages the core network 4.

When an abnormality is detected in resource information of the CN communication device 45, 46 acquired from the CN controller 40, a cooperation control unit 13 of the attack detection device 10 outputs a request for analysis processing of analyzing communication data of a RAN communication device 25, 26, 35, 36 to the RAN controller 20, 30.

The attack detection unit 12 of the attack detection device 10 detects the cyber attack based on a result of the analysis processing.

In order to identify a source of occurrence of a cyber attack that is performed in a distributed manner, such as the Volumetric DDos attack, detailed analysis processing of analyzing communication data of RAN communication devices 25, 26, 35, and 36 is needed. However, constant execution of such detailed analysis processing may cause an increase in a communication load or power consumption.

The attack detection system 1 executes analysis processing by temporarily activating a security analysis device 27, 37 in a RAN controller 20, 30 when a resource abnormality of a CN communication device 45, 46 of the core network 4 that relays data between the RAN 2, 3 and the external network 200 is detected. As a result, as compared with a case where the analysis processing is constantly executed, it may be possible to identify the source of occurrence of the cyber attack while reducing the communication load and power consumption.

(6) The RAN controller 30 includes a HW accelerator 38 (a hardware accelerator) in addition to the security analysis device 37.

The security analysis device 37 is activated in response to the request for analysis processing and executes the analysis processing.

The HW accelerator 38 executes transfer processing of transferring communication data from the RAN communication device 35, 36 to the security analysis device 37 and executes a part of the analysis processing offloaded from the security analysis device 37.

As a result, the attack detection system 1 may reduce an operation delay of the analysis processing and may reduce power consumption for the analysis processing.

Note that, in the present embodiment, an example has been described in which a HW accelerator 38 is provided only in RAN 3. However, a HW accelerator 38 may also be provided in RAN 2.

The above effect may be applied to an attack detection method performed by the attack detection device 10 and an attack detection program for causing the computer 900 to function as the attack detection device 10.

First Modification

Figure 6:
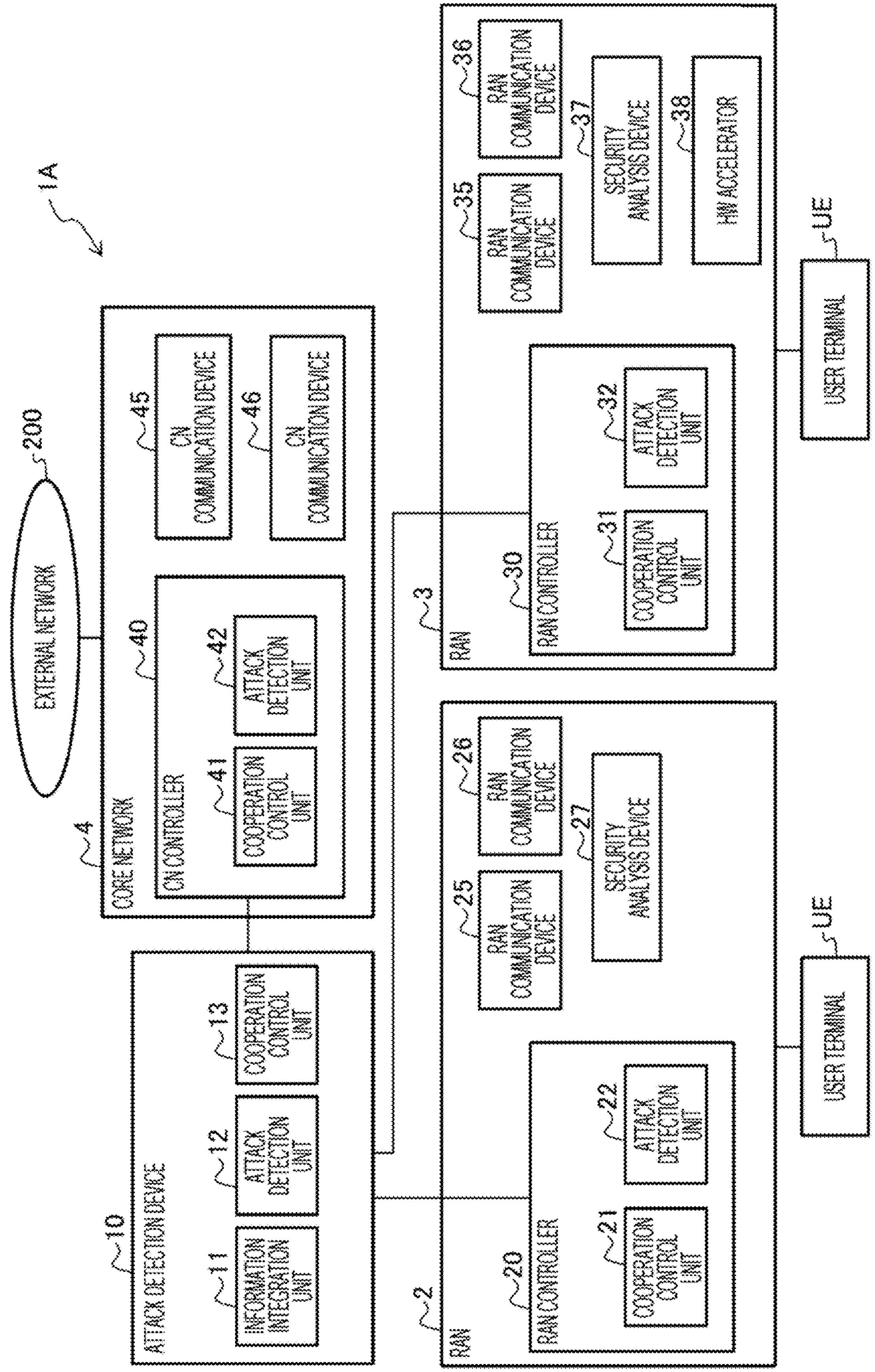
FIG. 6 is a block diagram illustrating a configuration of an attack detection system according to a first modification.

FIG. 6 is a block diagram illustrating a configuration of an attack detection system 1A according to a first modification.

In the first modification, an example will be described in which a RAN controller 20, a RAN controller 30, and a CN controller 40 include an attack detection unit 22, an attack detection unit 32, and an attack detection unit 42 respectively.

As illustrated in FIG. 6, in the first modification, the RAN controller 20 includes an attack detection unit 22 in addition to a cooperation control unit 21. The RAN controller 30 includes an attack detection unit 32 in addition to a cooperation control unit 31. The CN controller 40 includes an attack detection unit 42 in addition to a cooperation control unit 41.

In the first modification, the attack detection units 22 and 32 of the RAN controllers 20 and 30 may execute the attack detection processing executed by the attack detection unit 12 of the attack detection device 10. Furthermore, abnormality detection processing of detecting an abnormality in resource information of a CN communication device 45, 46 executed by the attack detection unit 12 may be executed by the attack detection unit 42 of the CN controller 40.

In a case where the attack detection system 1A according to the first modification executes the processing of Example 1 shown in FIG. 3, the attack detection units 22 and 32 of the RAN controllers 20 and 30 may execute the attack detection processing of step S103.

In this case, when completing the information integration processing in step S102, the attack detection device 10 outputs the integrated pieces of resource information to each of the RAN controllers 20 and 30. The attack detection units 22 and 32 of the RAN controllers 20 and 30 execute the attack detection processing on the basis of the inputted integrated pieces of resource information. In a case where an attack detection unit 22, 32 detects a cyber attack through the attack detection processing, the RAN controller 20, 30 may perform attack handling of step S105 as in the embodiment described above.

In a case where the attack detection system 1A according to the first modification executes the processing of Example 2 shown in FIG. 4, the attack detection unit 42 of the CN controller 40 may execute the resource abnormality detection processing of step S202. In a case where an abnormality of resource information is detected by the attack detection unit 42, the attack detection unit 42 inputs a detection result in the attack detection device 10. The cooperation control unit 13 of the attack detection device 10 may output an analysis request to a RAN controller of a suspicious RAN in the same way as the embodiment described above (step S203). Further, in the first modification, the attack detection unit 22, 32 of a RAN controller 20, 30 may execute the attack detection processing of step S208 on the basis of an analysis result of a security analysis device 27, 37.

Second Modification

Figure 7:
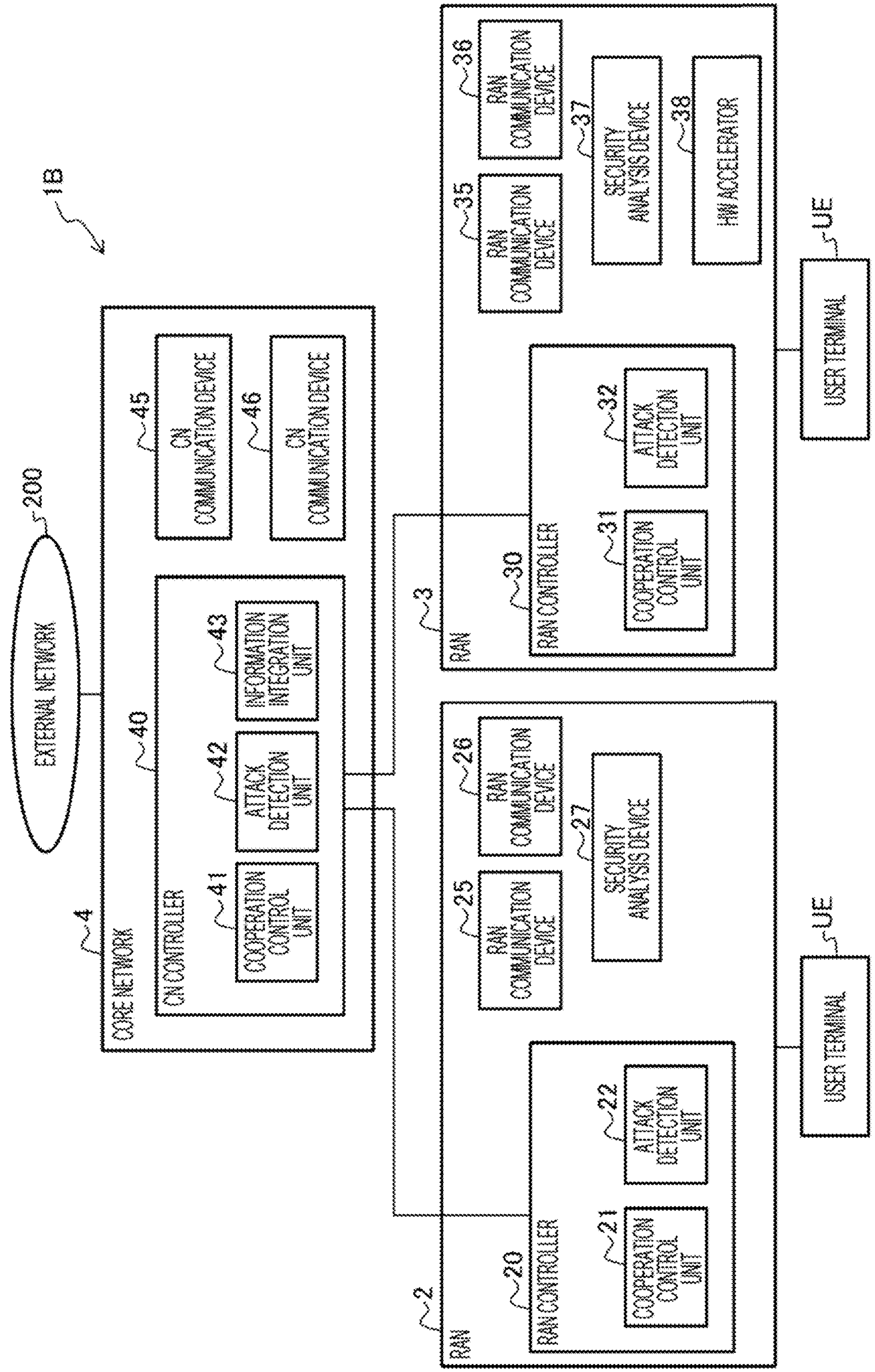
FIG. 7 is a block diagram illustrating a configuration of an attack detection system according to a second modification.

FIG. 7 is a block diagram illustrating a configuration of an attack detection system 1B according to a second modification.

In the second modification, an example will be described in which a CN controller 40 is configured as an attack detection device 10 instead of providing an independent attack detection device 10.

As illustrated in FIG. 7, the CN controller 40 that is the attack detection device 10 includes an information integration unit 43 in addition to the cooperation control unit 41 and the attack detection unit 42.

The CN controller 40 communicates with RAN controllers 20 and 30 and performs cooperation control of the RAN controllers 20 and 30.

In a case where the attack detection system 1B according to the second modification executes the processing of Example 1 shown in FIG. 3, the information integration unit 43 of the CN controller 40 executes the information integration processing of step S102, the attack detection unit 42 executes the attack detection processing of step S103, and the cooperation control unit 41 executes the cooperation control processing of step S104. In a case where the attack detection system 1B according to the second modification executes the processing of Example 2 shown in FIG. 4, the attack detection unit 42 of the CN controller 40 may execute the resource abnormality detection processing of step S202. Furthermore, in a case where an abnormality of resource information is detected, the cooperation control unit 41 of the CN controller 40 may issue the analysis request of step S203 to a RAN controller 20, 30. The attack detection unit 42 of the CN controller 40 may execute the attack detection processing of step S208 on the basis of an analysis result of the RAN controller 20, 30. In a case where a cyber attack is detected, the cooperation control unit 41 may execute the cooperation control processing of step S209.

Note that the present invention is not limited to the above-described embodiment, and many modifications may be made by those skilled in the art within the technical idea of the present invention.

The following supplementary note is disclosed regarding the attack detection device 10 indicated in the present embodiment.

(Supplementary Note 1)

An attack detection device detects a cyber attack in a mobile network that includes: a radio access network including a first communication device that performs wireless communication with a user terminal UE; and a core network that includes a second communication device that controls the wireless communication in the radio access network and relays data between the radio access network and an external network. The attack detection device includes:

- a cooperation control unit that acquires resource information of the second communication device and, when an abnormality is detected in the resource information of the second communication device, controls a controller of the radio access network to make the controller execute analysis processing of analyzing communication data of the first communication device; and
- an attack detection unit that detects the cyber attack based on a result of the analysis processing.

REFERENCE SIGNS LIST

- 1, 1A, 1B Attack detection system
- 10 Attack detection device
- 11 Information integration unit
- 12 Attack detection unit
- 13 Cooperation control unit
- 2, 3 RAN (radio access network)
- 20, 30 RAN controller (first controller)
- 21, 31 Cooperation control unit
- 22, 32 Attack detection unit
- 25, 26, 35, 36 RAN communication device (first communication device)
- 4 Core network
- 40 CN controller (second controller)
- 41 Cooperation control unit
- 42 Attack detection unit
- 43 Information integration unit
- 45, 46 CN communication device (second communication device)
- 100 Mobile network
- 200 External network

The invention claimed is:

1. An attack detection system that detects a cyber attack in a mobile network including a plurality of radio access networks and a core network, wherein each of the plurality of radio access networks comprises a first communication device that includes a first processor and performs wireless communication with a user terminal, and wherein the core network comprises a second communication device that includes a third processor, controls the wireless communication in the plurality of radio access networks, and relays data between the plurality of radio access networks and an external network, the attack detection system comprising:

- an attack detection device including a second processor;
- a first controller provided in each of the plurality of radio access networks and configured to manage a corresponding radio access network; and
- a second controller provided in the core network and configured to manage the core network, wherein
- the second controller of the core network is configured to transmit resource information of the second communication device of the core network to the attack detection device,
- the resource information of the second communication device includes inflow amounts of data from each of the plurality of radio access networks,
- the second processor of the attack detection device is configured to:
- detect an abnormality in the resource information of the second communication device of the core network acquired from the second controller when an inflow amount of data from a first radio access network exceeds a threshold value;

output a request for analysis processing of analyzing communication data of the first communication device to the first controller of the first radio access network in response to detecting the abnormality, and detect the cyber attack based on a result of the analysis processing, the request for analysis processing includes information on the abnormality in the resource information of the second communication device, and in response to receiving the request for analysis processing, the first controller of the first radio access network is configured to:

transfer the communication data from the first communication device to itself; and analyze the transferred communication data to determine whether there is communication data related to the abnormality in the resource information of the second communication device.

2. The attack detection system according to claim 1, wherein the first controller includes:

a security analysis device configured to be temporarily activated in response to the request for analysis processing to execute the analysis processing; and a hardware accelerator configured to execute transfer processing of transferring the communication data from the first communication device to the security analysis device and execute a part of the analysis processing offloaded from the security analysis device.

3. The attack detection system according to claim 1, wherein the second processor is configured to:

acquire pieces of resource information of the first communication devices and integrate the pieces of resource information; and detect the cyber attack based on the integrated pieces of resource information.

4. The attack detection system according to claim 3, wherein the second processor is configured to integrate the pieces of resource information by associating control information of the wireless communication acquired from the core network with the pieces of resource information of the first communication devices.

5. The attack detection system according to claim 1, wherein the second processor is configured to:

share information regarding the cyber attack detected by the attack detection device with the first controller of the first radio access network; and control the first controller of the first radio access network to make the first controller handle the cyber attack.

6. An attack detection method of an attack detection system that detects a cyber attack in a mobile network including a plurality of radio access networks and a core network, wherein each of the plurality of radio access networks comprises a first communication device that includes a first processor and performs wireless communication with a user terminal, and wherein the core network comprises a second communication device that includes a third processor, controls the wireless communication in the plurality of radio access networks, and relays data between the plurality of radio access networks and an external network, wherein the attack detection system comprises:

an attack detection device including a second processor;

a first controller provided in each of the plurality of radio access networks and configured to manage a corresponding radio access network; and a second controller provided in the core network and configured to manage the core network, and the attack detection method comprises:

transmitting, by the second controller of the core network, resource information of the second communication device of the core network to the attack detection device, wherein the resource information of the second communication device includes inflow amounts of data from each of the plurality of radio access networks;

detecting, by the second processor of the attack detection device, an abnormality in the resource information of the second communication device of the core network acquired from the second controller when an inflow amount of data from a first radio access network exceeds a threshold value;

outputting, by the second processor of the attack detection device, a request for analysis processing of analyzing communication data of the first communication device to the first controller of the first radio access network in response to detecting the abnormality, wherein the request for analysis processing includes information on the abnormality in the resource information of the second communication device;

detecting, by the second processor of the attack detection device, the cyber attack based on a result of the analysis processing; and, in response to the first controller of the first radio access network receiving the request for analysis processing, transferring, by the first controller of the first radio access network, the communication data from the first communication device to the first controller, and analyzing, by the first controller of the first radio access network, the transferred communication data to determine whether there is communication data related to the abnormality in the resource information of the second communication device.

7. A non-transitory storage medium storing an attack detection program causing computers to function as an attack detection system that detects a cyber attack in a mobile network including a plurality of radio access networks and a core network, wherein each of the plurality of radio access networks comprises a first communication device that includes a first processor and performs wireless communication with a user terminal, and wherein the core network comprises a second communication device that includes a third processor, controls the wireless communication in the plurality of radio access networks, and relays data between the plurality of radio access networks and an external network, wherein the attack detection system comprises:

an attack detection device including a second processor;

a first controller provided in each of the plurality of radio access networks and configured to manage a corresponding radio access network; and a second controller provided in the core network and configured to manage the core network, and the attack detection program causes the computers to perform operations comprising:

transmitting, by the second controller, resource information of the second communication device of the core network to the attack detection device, wherein the resource information of the second communication device includes inflow amounts of data from each of the plurality of radio access networks;

detecting, by the second processor of the attack detection device, an abnormality in the resource information of the second communication device of the core network acquired from the second controller when an inflow amount of data from a first radio access network exceeds a threshold value;

outputting, by the second processor of the attack detection device, a request for analysis processing of analyzing communication data of the first communication device to the first controller of the first radio access network in response to detecting the abnormality, wherein the request for analysis processing includes information on the abnormality in the resource information of the second communication device;

detecting, by the second processor of the attack detection device, the cyber attack based on a result of the analysis processing; and, in response to the first controller of the first radio access network receiving the request for analysis processing, transferring, by the first controller of the first radio access network, the communication data from the first communication device to the first controller, and analyzing, by the first controller of the first radio access network, the transferred communication data to determine whether there is communication data related to the abnormality in the resource information of the second communication device.

* * * * *